United States Patent [19]

David

[11] Patent Number: 5,879,605
[45] Date of Patent: Mar. 9, 1999

[54] METHOD FOR FORMING SOLES

[75] Inventor: Loïc David, Voiron, France

[73] Assignee: Societe D'Importation De Diffusion Ou Distribution D'Articles De Sport S.I.D.A.S., Voiron, France

[21] Appl. No.: 765,220

[22] PCT Filed: Jul. 11, 1995

[86] PCT No.: PCT/FR95/00932

§ 371 Date: Mar. 19, 1997

§ 102(e) Date: Mar. 19, 1997

[87] PCT Pub. No.: WO96/02375

PCT Pub. Date: Feb. 1, 1996

[30] Foreign Application Priority Data

Jul. 13, 1994 [FR] France ................................. 94 08932

[51] Int. Cl.$^6$ ..................................................... B29C 33/40
[52] U.S. Cl. .......................... 264/223; 264/101; 264/222; 264/571; 264/DIG. 30; 264/DIG. 78; 425/2
[58] Field of Search ................................ 264/223, 222, 264/DIG. 30, 101, 571, DIG. 78; 425/2

[56] References Cited

U.S. PATENT DOCUMENTS

| 2,499,324 | 2/1950 | Mead | 18/55 |
| 3,848,287 | 11/1974 | Simonsen | 12/142 P |
| 3,995,002 | 11/1976 | Brown | 264/90 |
| 4,869,001 | 9/1989 | Brown | 36/115 |

FOREIGN PATENT DOCUMENTS

| A-0 536 055 | 4/1993 | European Pat. Off. . |
| A-1 465 979 | 1/1976 | France . |
| A-2 366 006 | 4/1978 | France . |
| A-672 590 | 12/1989 | Switzerland . |

*Primary Examiner*—Jan H. Silbaugh
*Assistant Examiner*—Suzanne E. Mason
*Attorney, Agent, or Firm*—Oliff & Berridge, PLC

[57] ABSTRACT

The invention provides a method for preforming soles which includes compressing a foot so as to push soft fat tissue masses of the foot on its underside and inner and outer lateral arches inward toward a top of the leg; making an accurate molding of the foot thus compressed by using material for making the molding which is capable of flowing into cavities which result from the compression of the foot and which is capable of filling the cavities; removing the foot from the molding; and placing a sole blank on a bottom of the molding, the blank preferably having been treated so as to be capable of being shaped by pressure from a foot on it; and pressing the foot, which is still compressed, onto the blank so as to shape it between an inner face of the foot and the bottom of the molding. The apparatus of the invention includes at least one tube, connected to a vacuum source to be connected to an interior space of at least one bag made from airtight material into which a user's foot may be placed, with gripping means being provided for tightening an upper part of the bag around the user's lower leg and at least one airtight flexible pouch containing a granular material such as polystyrene pellets, the pouch being connected to a source for placing its inner volume under vacuum.

6 Claims, 3 Drawing Sheets

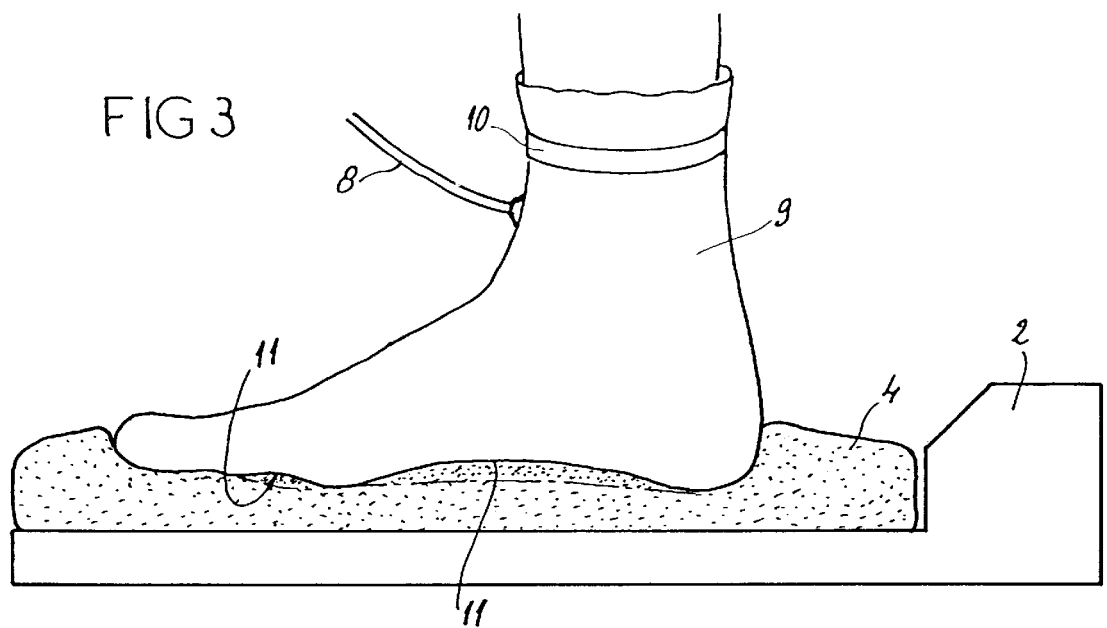
FIG 3
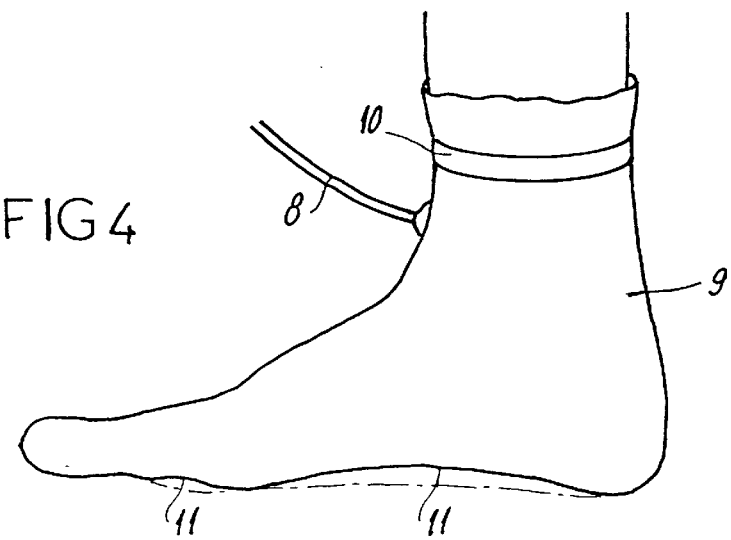
FIG 4
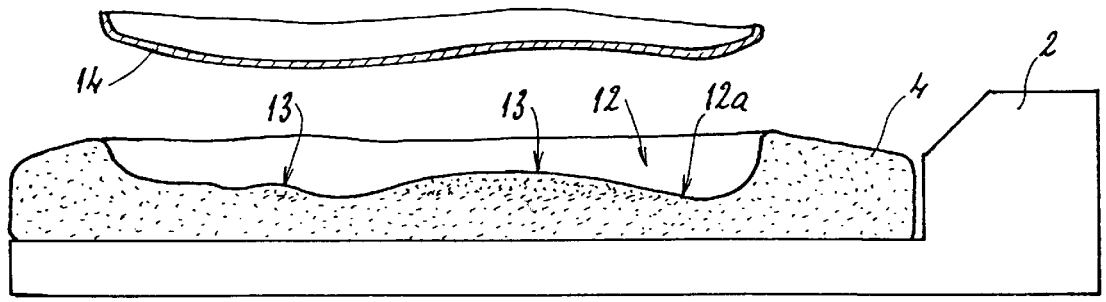

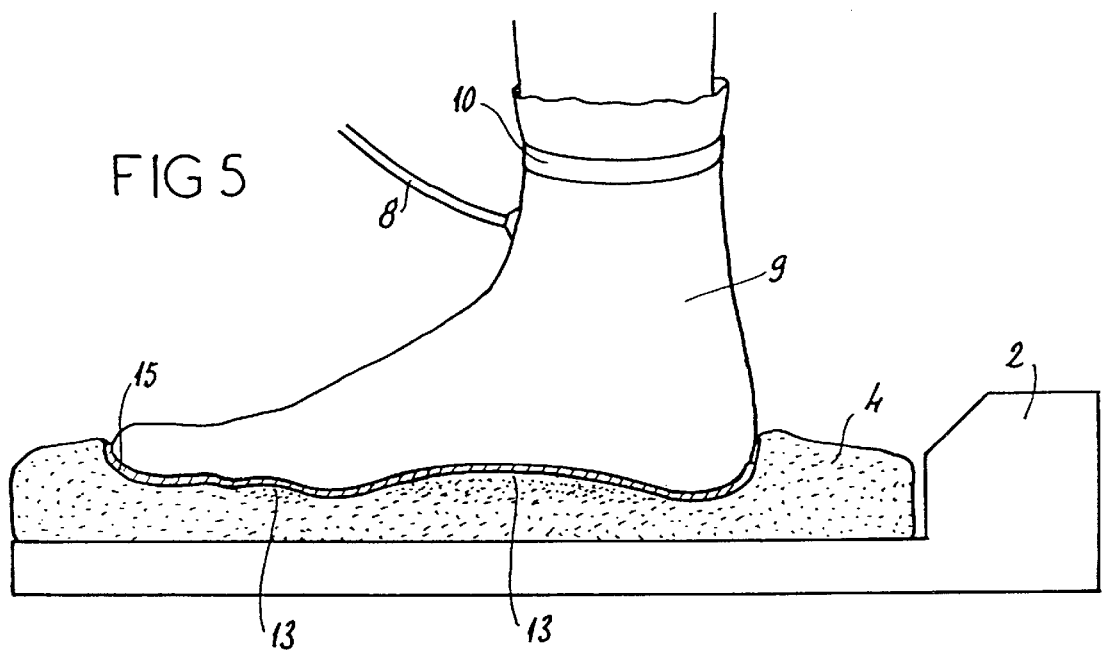

METHOD FOR FORMING SOLES

BACKGROUND OF THE INVENTION

The present invention relates to a method for forming soles and a device for implementing this method.

This method and this device are intended, in particular, for manufacturing corrective soles which can be used in podology or high-performance soles to be used when taking part in sports.

It is known to make the molding of a foot by means of an apparatus comprising at least one airtight flexible pouch containing a granular material such as polystyrene pellets, the pouch being connected to a vacuum pump enabling it to be placed under vacuum. For making the molding, the foot is firstly pressed on the pouch, the inner volume of which is then at atmospheric pressure, until it pushes into the granular material. The pouch is then placed under vacuum. It shrinks around the foot, drawing the granular material together, and preserves the molding thus obtained for as long as the vacuum is maintained.

A sole blank cut from a sheet of thermoplastic material is then heated by suitable means and is then placed in the bottom of the molding. The user again inserts his foot in the molding and presses on this blank to mold it by squashing it between the underside of his foot and the bottom of the molding. After cooling, the blank preserves the shape imparted to it by the foot and by the bottom of the molding and constitutes a sole to be placed in a shoe.

When it is desired to obtain a corrective sole, the usual procedure is to place, on the bottom of the molding, one or more corrective elements, of slightly domed shape, for creating a convex relief at the appropriate places of the sole blank. This or these elements are usually placed at the location of the metatarsal heads and are commonly called "metatarsal pads" or "retrocapital bars".

The convex reliefs thus obtained on the sole make it possible to relieve the metatarsal pressure and to reshape the natural arch of the front of the foot at the metatarsal heads, this arch tending to collapse when the foot is pressing down.

In practice, it is very difficult to position these metatarsal pads or retrocapital bars completely accurately. A fault in positioning gives rise to the metatarsal heads pressing against this relief of the sole, which can prove to be uncomfortable, painful in the long term, and even traumatizing.

A reduction in the dimensions of the pad for relieving this positioning inaccuracy leads to a reduction in the dimensions of the convex reliefs created on the sole and therefore the efficiency of the foot's support.

Furthermore, it is also very difficult accurately to determine the thickness to give to these metatarsal pads or retrocapital bars. This is because the flexibility of the foot at the metatarsal heads varies a great deal from one individual to another. An excessive height of the pad is uncomfortable and painful for the user, whereas an insufficient height limits the foot's support and thus to reduce [sic] the efficiency of the sole.

The present invention aims to remedy this main drawback by providing a method which makes it possible to obtain a positioning and a shape, perfectly adapted to each user, of the convex reliefs of the sole for supporting the foot, as well as the inner and outer lateral plantar arches of the foot.

To this end, the method to which it relates comprises the steps of:

compressing the foot so as to push the soft fat tissue masses it comprises on its underside and inner and outer lateral arches inward, i.e. toward the top of the leg;

making an accurate molding of the foot thus compressed, i.e. by using a material for making a molding which is capable of flowing into the cavities which result from the compression of the foot and which is capable of filling these cavities;

removing the foot from the molding;

placing a sole blank in the bottom of the molding, this blank preferably having been treated so as to be capable of being shaped by pressure from the foot on it; and pressing the foot, which is still compressed, onto this blank so as to shape it between the inner face of the foot and the bottom of the molding.

The foot actually comprises bony parts, such as the metatarsal heads, which are hard, and fatty or tissue parts, which are soft. These soft parts tend to collapse when the foot is pressing down, particularly at the location of the abovementioned metatarsal heads and lateral arches. It thus appears that many feet, at the location of these heads and of these arches, form a convex molding when they are pressing down, whereas this molding is naturally flattened or concave at these same locations of the foot when the foot is not pressing down.

According to the prior art, the molding is made when the foot is not compressed and when it is pressing down, therefore when its soft parts have collapsed. The result of this is that it is necessary to use the "pads" or "bars" referred to hereinabove, and that soles of inaccurate shape are obtained which do not provide complete support for the foot.

In the method according to the invention, compression of the soft parts of the foot makes it possible to prevent any collapse of these soft parts when making the molding, so that the underside of the foot retains the shape it has naturally, i.e. when it is not pressing down. Moreover, this compression makes it possible to place the foot in a configuration which reproduces the constraints of a shoe.

The molding of the foot is then made using a material capable of flowing into the cavities formed by the compression of the soft matter, i.e. so as perfectly to match the underside of the foot thus compressed.

The molding obtained corresponds to the shape which the foot has when it is not pressing down. In particular, it has one or more convex reliefs in its portion which corresponds to the metatarsal heads and to the inner and outer arches.

When the blank of the sole is being formed between the foot and the bottom of the molding, by pressing the foot down on the blank, the domed reliefs of the molding are reproduced on the blank and give the sole obtained a shape which corresponds accurately to that of the user's foot. By virtue of these reliefs, the sole obtained provides perfect support for the foot and is perfectly adapted to the user's foot, particularly as regards the positioning and the height of these reliefs as well as the constraints exerted on the foot by a shoe.

The foot is compressed preferably by means of a flexible bag made from airtight material into which a tube, connected to a source for placing under vacuum, emerges, means being provided for tightening the upper part of the bag around the user's lower leg after the foot has been inserted in the bag.

Placing the inner volume of the bag under vacuum makes it possible to obtain a uniformly distributed compression of the entire foot.

The molding is advantageously made by means of at least one airtight flexible pouch containing a granular material such as polystyrene pellets, the pouch being connected to a source for placing its inner volume under vacuum.

The foot's pressing on the pouch makes it possible to force the granular material in the direction of the cavities which result from the compression of the soft parts of the foot. The pressure of the foot on the pouch distributes the granular material naturally and causes it to flow into the aforementioned cavities.

The method of the invention is preferably applied simultaneously to both of the user's feet so as to enable him to press down on both his feet when the molding is made and the sole blanks are shaped.

The invention also relates to the device for implementing this method.

This device is of the type comprising at least one airtight flexible pouch containing a granular material such as polystyrene pellets, the pouch being connected to a source for placing its interior volume under vacuum. According to the invention, the device comprises at least one tube, connected to the source for placing under vacuum, to be connected to the interior space of at least one bag made from airtight material into which the user's foot may be placed, gripping means being provided for tightening the upper part of the bag around the user's lower leg.

These means preferably consist of a strip which has complementary self-gripping surfaces.

So that it can be understood properly, the invention is again described hereinbelow with reference to the appended diagrammatic drawing which, by way of nonlimiting examples, represents various phases in the method to which it relates and the device for implementing this method.

BRIEF DESCRIPTION OF THE DRAWINGS

FIGS. 2 to 5 are views of the device in section along the line II—II in FIG. 1, during various successive implementational phases of the method.

DETAILED DESCRIPTION OF PREFERRED EMBODIMENTS

Figure 1:
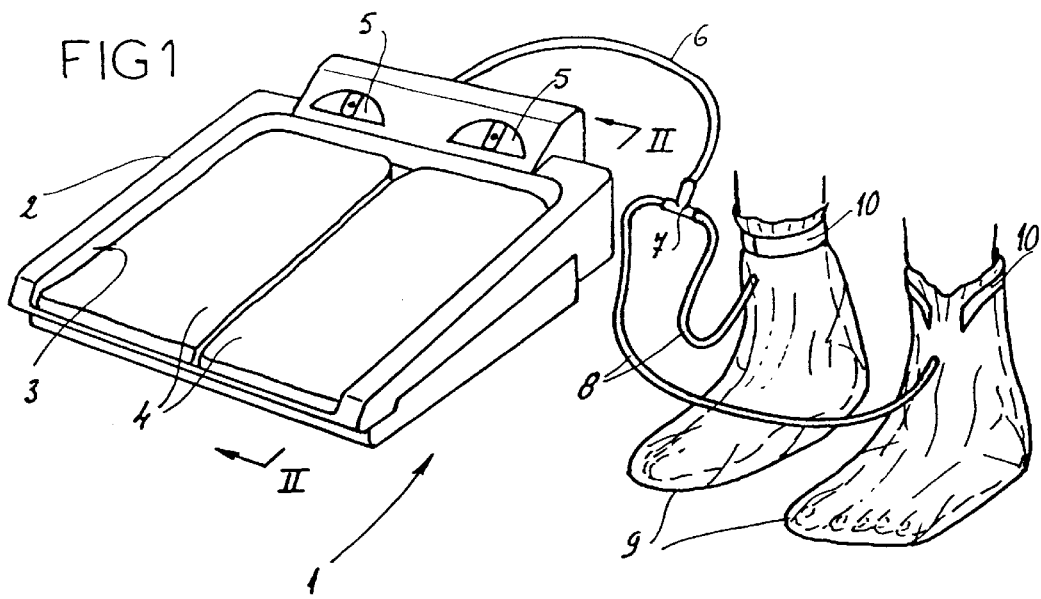
FIG. 1 is a perspective view of this device.

FIG. 1 shows a device 1 which makes it possible to form soles, for supporting feet, to be placed in the bottom of shoes.

The device 1 comprises a casing 2 delimiting a central recess 3 into which two airtight flexible pouches 4, containing polystyrene pellets, are placed. The two pouches 4 are connected to a vacuum pump housed in the casing 2, permitting the placing of their interior volume under vacuum.

The placing of the pouches 4 in communication with the vacuum pump or with the open air is controlled by two buttons 5 connected to corresponding valves, which are also housed in the casing 2.

On its rear face, the casing 2 comprises a connecting piece (not visible in FIG. 1) connected to the vacuum pump, to which connecting piece a flexible tube 6 is connected. The free end of this flexible tube 6 is connected to a "T" connector 7, to which two flexible tubes 8 are connected. Each of these tubes 8 emerges in the interior space of a bag 9 made from airtight plastic, in which the user's foot may be placed.

After the foot has been inserted into the bag 9, elastically extendible strips 10 which have complementary self-gripping surfaces are placed on the user's lower leg so as to provide this bag 9 with an airtight seal.

A vacuum is then formed in the bag 9 by placing the tubes 6 and 8 in communication with the vacuum pump. This placing under vacuum causes a compression of the foot such that the soft fatty tissue masses, which the foot comprises on its underside and inner and outer lateral arches, is pushed inward, i.e. toward the top of the leg.

Figure 2:
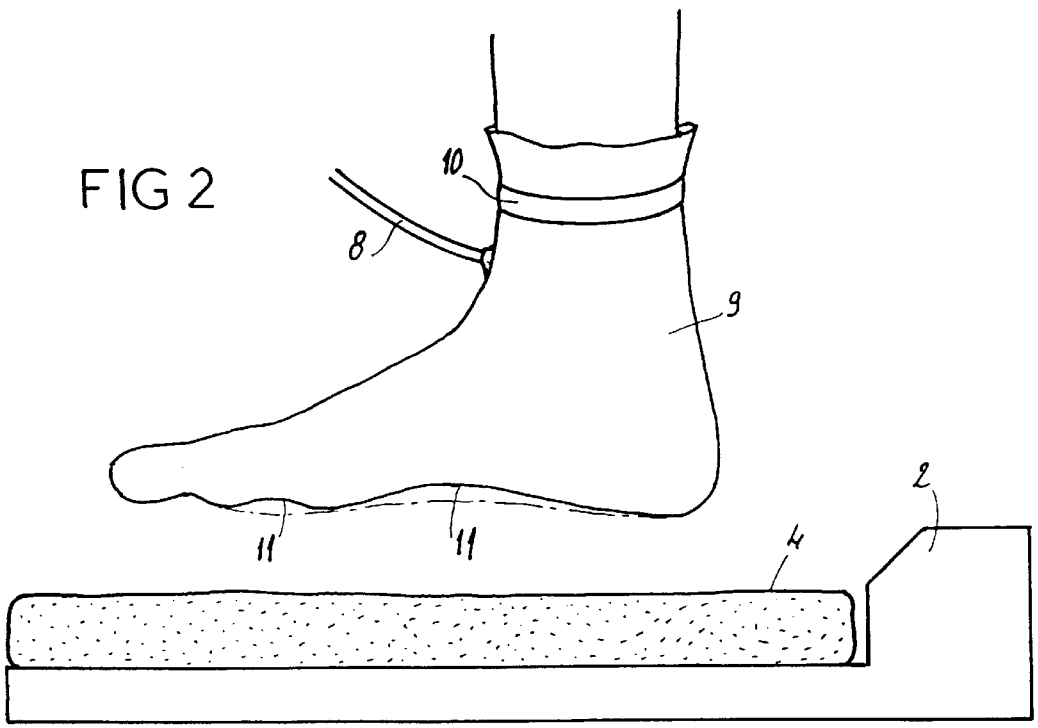

FIG. 2 shows the casing 2 and one of the pouches 4, the interior volume of which is then open to the air, as well as one of the user's feet placed in the bag 9. The foot is presented opposite the pouch 4 and then, the compression being maintained, is pressed down on the pouch 4 until it pushes into the polystyrene pellets, as shown in FIG. 3. The pressing down of the foot on the pouch 4 makes it possible to force the polystyrene pellets in the direction of the cavities 11 which result from the compression and naturally to distribute these pellets under the foot, causing them to flow into the cavities 11.

The pouch 4 is then placed in communication with the vacuum pump, which the casing 2 comprises, by operating the buttons 5. The vacuum exerted causes the pouch 4 to retract around the foot, drawing the polystyrene pellets together, up to a limit determined by the limit of extendibility of the pouch 4 (or the limit of compressibility of the pellets) and by the power of the pump. When equilibrium is achieved, the pouch 4 will have become rigid and preserves the molding of the foot.

The foot is then removed from the molding 12 thus obtained. As FIG. 4 shows, the bottom 12a of the molding 12 has domed reliefs 13 corresponding to the cavities 11 which result from the compression of the foot. These reliefs 13 are located, in particular, in that portion of the molding 12 which corresponds to the metatarsal heads and the lateral arches of the foot.

A sole blank 14 made from thermoplastic material is then placed against the bottom 12a of the molding 12, this blank 14 having previously been heated so that its constituent material is made malleable.

FIG. 5 shows that the foot, still compressed, is pressed down on this blank 14 so as to shape it between the underside of the foot and the bottom 12a.

As is revealed in this figure, the domed reliefs 13 are reproduced on the blank 14 and give the sole 15 obtained a shape which corresponds accurately to that of the user's foot.

By virtue of these reliefs which are perfectly adapted to the specific shape of the user's foot, particularly as regards their positioning and their height, the sole 15 provides perfect support for the foot. Furthermore, it matches the constraints exerted on the foot by a shoe.

The device 1 according to the invention makes it possible to apply the method described hereinabove simultaneously to both of the user's feet in order to enable him to press down on both of his feet when the molding is made and the blanks 14 are shaped, which facilitates these operations.

I claim:

1. A method for forming a sole comprising:
   compressing a foot so as to push soft fat tissue masses of the foot on its underside and inner and outer lateral arches inward toward a top of the leg;
   making an accurate molding of the foot thus compressed by pressing the compressed foot onto a material for making a molding, the material flowing into cavities which result from the compression of the foot and filling the cavities;
   removing the foot from the molding, while maintaining the compression of the foot and preserving the molding of the foot set in the material for making the molding;
   placing a sole blank on a bottom of the molding,;
   replacing the foot which is still compressed into the molding containing the sole blank so that the foot contacts the sole blank; and pressing the foot, which is still compressed, onto the sole blank so as to shape the sole blank between an inner face of the compressed foot and the bottom of the molding to form the sole.

2. The method according to claim 1, wherein the foot is compressed by means of a flexible bag made from airtight material into which a tube connected to a vacuum source emerges, with means being provided for tightening an upper part of the bag around a user's lower leg after the foot has been inserted into the bag.

3. The method according to claim 1, wherein the material for making the molding comprises at least one air tight flexible pouch containing a granular material, the pouch being connected to a source for placing an inner volume of the pouch under vacuum, wherein the step of making the molding comprises pressing the compressed foot on the pouch while the pouch is open to the air so as to force the granular material in the direction of the cavities, and subsequently placing the inner volume of the pouch under vacuum to cause the pouch to retract around the foot and draw the granular material together so as to preserve the molding of the foot.

4. The method according to claim 1, wherein the method is applied simultaneously to both of a user's feet.

5. The method according to claim 1, wherein the sole blank is treated so as to be capable of being shaped by pressure of the foot on it.

6. The method according to claim 3, wherein the granular material comprises polystyrene pellets.

* * * * *